(12) United States Patent
Machabee

(10) Patent No.: US 8,070,225 B2
(45) Date of Patent: Dec. 6, 2011

(54) CHILD SEAT ARTICLE HOLDER

(76) Inventor: Joya Machabee, Reno, NV (US)

( * ) Notice: Subject to any disclaimer, the term of this patent is extended or adjusted under 35 U.S.C. 154(b) by 417 days.

(21) Appl. No.: 12/100,924

(22) Filed: Apr. 10, 2008

(65) Prior Publication Data

US 2008/0252115 A1  Oct. 16, 2008

Related U.S. Application Data

(60) Provisional application No. 60/911,059, filed on Apr. 10, 2007.

(51) Int. Cl.
*A47C 31/00* (2006.01)
*A47C 7/62* (2006.01)

(52) U.S. Cl. ............ 297/219.12; 297/188.01; 297/188.2

(58) Field of Classification Search ............. 297/219.12, 297/188.08, 188.01, 256.17, 188.2
See application file for complete search history.

(56) References Cited

U.S. PATENT DOCUMENTS

| | | | |
|---|---|---|---|
| 1,978,970 A * | 10/1934 | Thornhill et al. | ......... 150/130 X |
| 2,979,098 A | 4/1961 | Greaves | |
| 4,050,491 A | 9/1977 | Hargrove | |
| 4,824,168 A | 4/1989 | Makoski | |
| 5,178,310 A | 1/1993 | Sowerby | |
| 5,615,925 A | 4/1997 | Kain | |
| 6,019,510 A | 2/2000 | Gonzalez et al. | |
| 6,149,229 A | 11/2000 | Dillon, Jr. et al. | |
| 6,428,098 B1 | 8/2002 | Allbaugh | |
| 6,460,925 B1 | 10/2002 | Kovacs | |
| 6,467,839 B1 | 10/2002 | Kain | |
| 6,561,588 B1 * | 5/2003 | Brady | .................. 297/188.01 X |
| 7,600,619 B2 * | 10/2009 | Sapyta | ...................... 190/107 X |
| 2003/0042768 A1 | 3/2003 | Koehn | |
| 2005/0200169 A1 | 9/2005 | Tipton | |
| 2006/0049674 A1 | 3/2006 | Fair | |
| 2007/0018487 A1 | 1/2007 | Bibb et al. | |

* cited by examiner

*Primary Examiner* — Anthony D Barfield
(74) *Attorney, Agent, or Firm* — Klarquist Sparkman, LLP

(57) ABSTRACT

A system and method for supporting articles is generally provided for use, with a seat, such as a child's safety seat or stroller, having a seat surface and at least one restraining member that extends outwardly from the seat surface. The system may be provided with a support member having one or more pocket members for holding the articles. An aperture may be formed through the support member through which the restraining member may be passed to limit movement of the support member across the seat surface when the system is placed on the seat. In one aspect, the pocket members may at least partially depend from one or more side portions of the seat, with or without the use of a support member.

32 Claims, 5 Drawing Sheets

CHILD SEAT ARTICLE HOLDER

CROSS-REFERENCE TO RELATED PATENT APPLICATIONS

The invention claims priority from U.S. Provisional Patent Application No. 60/911,059 entitled CHILD SEAT ARTICLE HOLDER by Joya Machabee, filed on Apr. 10, 2007, which Provisional Patent Application is hereby incorporated by reference in its entirety.

BACKGROUND

It has often been desirable, if not necessary, to bring feeding bottles, cups, toys, books, and the like when traveling with children. For example, when traveling with children in a motor vehicle, the children have frequently asked the driver to hand the children one or more of such articles. This has not only posed an inconvenience to the driver, but has also proven to create potentially hazardous conditions, as the driver has had to reach into the rearward portions of the vehicle while driving. Further, the articles have frequently become loose within the cabin of the vehicle, rolling around and becoming not only potentially dangerous impediments to the driver's ability to properly control the vehicle but projectiles in the event of a sudden stop or accident.

Some prior storage devices for use with a vehicle seat have generally included a storage device with a storage container, such as a bag or pouch, that has had to be attached to a structural feature of a front seat within the vehicle. Such storage devices have been designed to store telecommunications equipment, such as the storage device disclosed by Dillion, Jr. et al., in U.S. Pat. No. 6,149,229. Unfortunately, such a storage device was impractical for use with a child safety seat. The Dillion, Jr. device necessitated mechanical fastening members to secure the device with a seat frame, beneath the seat cushion. Another previously described storage device for use in a vehicle included a saddle bag that was hung over the back of the vehicle seat, as taught by Greaves, in U.S. Pat. No. 2,979,098, and Bibb et al., in U.S. Patent Publication No. US 2007/0018487. However, these devices were also impractical for use with a child's safety seat as they were designed to hang from the top portion of the back support of a chair, disposing the pocket behind the seat. In another described method of use, the pocket was suspended from the chair, behind the legs of the individual seated in the chair. Such positioning of the storage pocket would not have been accessible to a child seated in a child's safety seat, with its restraining straps secured across the front of the child.

Other prior storage devices for use with child safety seats have included devices that were attached beneath the cushion of an arm rest on the safety seat, such as disclosed by Kain, in U.S. Pat. Nos. 6,467,839 and 5,615,925. However, these designs required specific coupling features formed into the frame of the seat that engaged specific mounting features on the storage devices. As such, the devices were not universally useable with a wide array of child's safety seats. Other designs, taught by Fair, in U.S. Patent Publication No. US 2006/0049674, and Tipton, in U.S. Patent Publication No. 2005/0200169, positioned mounting platforms of the storage devices between the safety seat and a vehicle seat on which the safety seat was positioned. As such, the storage devices were not easily or practically removed from, or engaged with, the child's safety seat without first disengaging the child's safety seat from the vehicle seat. Additional, storage devices have been presented for use with for use with an umbrella stroller that included an organizing apparatus, which hung over a back member of the stroller, such as that disclosed by Makoski, in U.S. Pat. No. 4,824,168. However, this device was secured with straps to the frame of the stroller so that the storage pockets hung from the top portion of the stroller, behind the seat. Such a device was not reasonably useable with a child's safety seat.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Various embodiments of an article holder and methods for use with various styles of child's safety seats, strollers and other such devices, are presented. The system is generally provided with a support member having one or more pocket members for holding the articles. In one aspect, the pocket members may at least partially depend from one or more side portions of the seat or other device to which they are secured. Various aspects of the system allow children to have efficient access to miscellaneous items, such as bottles, cups, snacks, books, toys and the like while they travel.

In various embodiments, the support member may be coupled with one or more pockets so that, when positioned in a seating area such as the seating area in a car seat or stroller, the support member traverses the seating area and positions the pockets against outer side portions of the seating area. This configuration may facilitate the ability of a child to efficiently access the at least one pocket while seating in the seating area.

It is contemplated that the size and shape of each pocket can, if desired, vary depending upon the needs of the user. The ability to adjust the size and/or shape of the pocket may allow the user to use the article storage system to store and secure multiple types of articles. In certain embodiments, the pocket may be of a depth that can allow a feeding bottle or drinking cup to be secured while the motor vehicle is operating and, if desired, also allow easy access to the bottle or cup by the child or other user. The pocket may be configured to allow books to be easily secured during travel. In some embodiments, the pockets may be formed to allow one or more various toys to be secured during travel.

In certain embodiments, one or more pockets may include a divider, such as a divider formed of flexible or non-flexible materials. The use of a flexible material may allow the system to be easily compacted when not in use or to allow the compartments to vary in size, depending on the size of the various objects inserted into the pocket. The use of a divider may also allow multiple items to be secured in a single pocket. In some embodiments, a divider may be used to separate an ice pack from a drink.

In certain embodiments, the one or more pockets may be secured to the child seat or stroller via a fastening mechanism. The fastening mechanism may be one of hook and loop fastening material, snaps, and other like fasteners. The fastening mechanism may be used in lieu of the support member. The fastening mechanism may be used in addition to the support member in which such mechanism facilitates the positioning and securing of the one or more pockets along the outer edge of the seating area In certain embodiments, one or more pockets may be secured to the support member using a fastening mechanism. This feature may allow a user to position the pocket as desired as well as allow the type of pocket to be changed depending upon the user's desires and circumstances at hand. The system may include a plurality of pockets each of which is shaped and sized to receive a particular type of object. In some embodiments, a user may easily attach and de-attach the pockets as desired.

In certain embodiments, the at least one pocket may include an insert that assists in the stabilizing the pocket. The insert may include plastic or metal and be positioned in the bottom of the pocket. The insert may be a plastic or metal insert that is in the shape capable of receiving a drink cup or bottle. In some embodiments, the insert may be covered with the material utilized to form the pocket.

In certain embodiments, the support member may be used to secure the article holder system within the seating area. The support member may be formed of flexible material. If desired, the support member may be formed with a flexible material covered with fabric.

The flexible, or other, material may provide rigidity to the support member while the fabric covering may provide comfort to the occupant. In certain embodiments, the flexible material may be a non-woven fabric, such as PELLON®. If desired, the size and shape of the support member may vary depending upon the needs of the user.

In certain embodiments, the length of the support member may be altered depending on the size of the seating area. The support member may also be secured to the seating area via a fastening mechanism such as hook and loop fastening material, such as VELCRO®.

In certain embodiments, the support member may include an aperture. The aperture may be of a size sufficient to allow a portion of a safety belt to be inserted through such aperture. The presence of an aperture may facilitate the use of the article storage system with a car seat or stroller. Such a structural arrangement may be used to limit movement of the support member across the seat or other device to which it is secured.

In some embodiments, the support member and/or pockets may be constructed from flexible material, including washable fabric, water-repellant fabric, and other materials that may allow the system to be efficiently cleaned. This feature may allow the system to be easily cleaned and maintained.

The use of a flexible material may also be less likely to cause injury to a user such as in a car accident when compared to prior storage devices constructed of more rigid materials, including plastic. The use of flexible material may allow the article holder system to be easily stored and carried, such as in a stroller when not in use.

In some embodiments, the support member and the pockets may be formed from different materials. In certain embodiments, the support member may be covered with a material that is gentle to a child's skin while the pockets are formed of a durable, water-repellant fabric. The use of a non-irritating material may be desirable for it may allow the system to be used by multiple users, including children with sensitive skin.

In certain methods of use, the support member may be placed in a desired seating area, such as that found in a child's safety seat, stroller and the like. The aperture present in the support member may be aligned with a safety harness present in the seating area so that the harness may travel through such aperture. A user may place the occupant into the seating area or the occupant of the seating area may enter the seating area without assistance from another. The harness may be threaded through the aperture and the occupant may be secured into the seat.

In certain embodiments, the user may align one or more pockets with respect to the seating area prior to the occupant sitting in the seating area or after the occupant enter such area. In certain embodiments in which the pockets have additional fastening mechanisms, such mechanisms may be fastened to further provide support to the pocket structures. Articles may be placed into the pockets either before the occupant occupies the seating area or after. In certain embodiments, dividers and/or inserts may be placed into the pocket structures as desired. The article holder system may be removed from the seating area once the occupant has exited such area. The article holder system may be stored for use at a later time or cleaned, as desired.

In certain methods of manufacture, construction of the support member may include cutting a base material to a size that will allow the desired seat area to be covered. In certain aspects, the base material may be cut to approximately 23 inches in length and approximately between 6 to 18 inches wide. At least one of the width or length of the base material may be determined by the size of the seating area. At least one of the width and length of the base material may be determined by the amount of the seating area one desires to cover. In certain embodiments, the base material may be approximately 10 inches in length and approximately 6 inches in width, weighing approximately 0.5 ounces to 1.0 ounces. In another embodiment, the base material may be approximately 12 inches in width, weighing approximately 1.0 to 1.5 ounces.

In some methods of manufacture, the support member may also be formed by folding the material inside out and fastening the edges of the material lengthwise. The material may be folded in half inside out and the edges of the material sewn together lengthwise. The material also may be inverted a second time so that the finished side may be presented to the user.

In certain methods of manufacture, the support member may include a flexible material to provide stability or rigidity to the support member. The flexible material may include a non-woven fabric such as PELLON®. The flexible material may be plastic or other material, in whole or in part.

The dimensions of the flexible material may vary according to the circumstances presented and intended uses of the system. The flexible material may be approximately 12 inches in length in some embodiments. The flexible material may be approximately half the width of the base material. In certain aspects, the flexible material may be inserted into a base material. This may allow the support member additional rigidity while still providing a comfortable surface on which the user may sit.

In certain embodiments, the flexible material may be inserted in the base material so that an equivalent amount of material may be present on either end of the base material. If desired, a flexible material may be used that includes an adhesive. The adhesive may be heat-activated adhesive that when activated allows the flexible material to adhere to the base material. This may also provide additional rigidity to the support member. An iron may be used to activate the heat sensitive adhesive. The heat sensitive adhesive may be activated after the flexible material is inserted into the base material, such as by use of an iron.

In certain embodiments, the support member may be manufactured to include an aperture, such as an aperture to receive a seat belt or other type of harness used to secure an occupant within a certain seating area. The aperture may be created by folding the support member, such as in half and making a cut in the member in the desired size. The cut may be approximately 4 inches in length and approximately 3 inches from the front of the base material. In some embodiments, the cut may be sewn such as Button sewn so that a harness may travel through the aperture.

In certain embodiments, the article holder may be manufactured by producing one or more pockets, which may be created by cutting material such as fabric to the desired size and shape.

In some embodiments, two pockets may be formed by cutting 8 front and back pieces of fabric 6 inches wide by 4½ inches tall, 8 side pieces 3 inches wide by 4½ inches tall, 4 bottom pieces 6 inches wide by 3 inches tall, and 4 insert pockets 3¾ inches by 3¾ inches. The material may be cut to provide a seam allowance of ⅝ inches. In some embodiments, each assembled pocket may weigh approximately 3.5 ounces to 4.0 ounces. As such, one embodiment of the system that includes a support member and one pocket member may weight approximately 4.0 ounces to 5.0 ounces. Another embodiment of the system that includes two pocket members and a support member may weigh 7.5 ounces to 9.0 ounces. Inserts may be formed to fit within the pockets. The insert may be formed by cutting plastic or a plastic-coated metal. An insert may be formed for each pocket, such as by cutting plastic or plastic-coated metal to be approximately 3 inches wide and 3½ inches tall.

In certain embodiment, a pocket may be formed by fastening the various pieces together. The order in which the pieces are secured may he varied. A back piece may be sewn to two side pieces, a front piece may then be sewn to the two side pieces, and a bottom piece may be sewn to the four pieces. A pocket may be inverted and attached to another pocket that has not been inverted. The two pocket structures may be fastened, such as by stitching, so that one long side remains unsecured (e.g., opened). The pieces of material may then be inverted while pushing one piece of material into the other, thereby forming a lined pocket. The edge of the pocket structure may be finished by sewing the edge. The edge may be finished while leaving one side of the edge open to attach the pocket onto the base material. In another embodiment, an additional line of stitching may be made on the pocket, for example, approximately one 1 below the first line of stitching while still leaving the one side open. In some embodiments, flexible material such as elastic may be inserted through the opening between the two sewn lines. The flexible material may be pulled slightly to gather the fabric on the side. The flexible material may be secured in the pocket. The flexible material may be secured by fastening the corner where the flexible material was inserted, such as by use of a stitch. The flexible material may also be inserted into the front and other side pieces of the pocket structure.

In certain embodiments, a method of manufacturing the system may include securing the one or more pockets to the support member. The at least one pocket may be secured by sewing the pockets onto an end of the base material utilized to construct the support member.

In particular embodiments, an insert material may be incorporated into the pockets. This material may be incorporated by sewing inverted insert material while leaving at least one side open to insert the insert material such as a plastic insert. Once sewn the insert material may be inverted again so that the finished side may be exposed to the user. In a certain embodiment, the insert material may be attached to a pocket by fastening the insert material (such as with stitching) to an inverted pocket structure. This may be performed by sewing the opposite side of the insert material that is open to the middle of the back of the pocket and then, inserting the insert into the open end and securing the insertion by fastening the opening shut (such as by stitching the opening closed).

In certain embodiments, additional fastening means may be used to secure the insert. Hook and loop fastening material may be attached to an insert, such as a 3 inch piece of approximately ½ inch to ¾ inch hook and loop fastening material. The non-fastening side of the fastening material may be sewn to end of an insert while the fastening side of the fastening material may be then sewn to the middle of the other side of an inverted pocket. The pocket may then be inverted again so that the finished side of the material may be seen by the user and the insert divider may then be connected to pocket structure via connecting the two pieces of hook and loop fastening material to each other.

In certain embodiments, a method of manufacturing the system may include adding additional material to the side of the base material that contacts the hack of the seating area. This feature may allow for an easier clean, for example, a user may just pull out the article holder system and wipe it off or wash it very easily. This feature may also act as a protector of the seating area.

It is contemplated that the system may be used with not only a car seat and stroller, but other similar seating areas such as those provided in wheel chairs, shopping carts, push cars, wagons, sit and stands, high chairs and booster seats. In some embodiments, variations of the system may be made to fit any seat by adding fasteners such as snaps, hook and loop fastening material, hook and eye or buckles to the side of the base material and have the pockets individually attached to the desired size.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
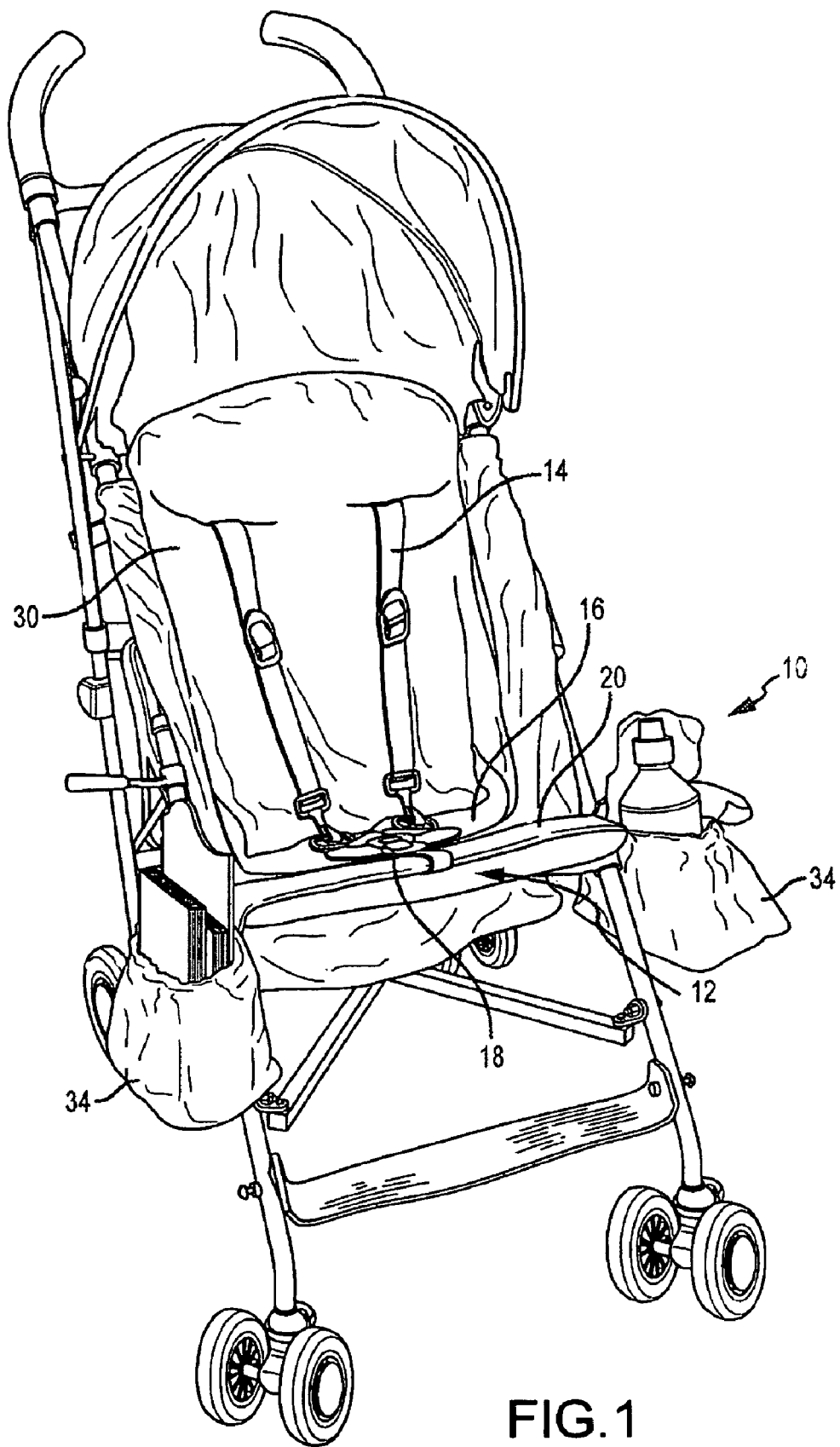
FIG. 1 is a perspective view of one embodiment of an article holder system and one manner in which the article holder system could be used with a seat device, such as a stroller.
Figure 2:
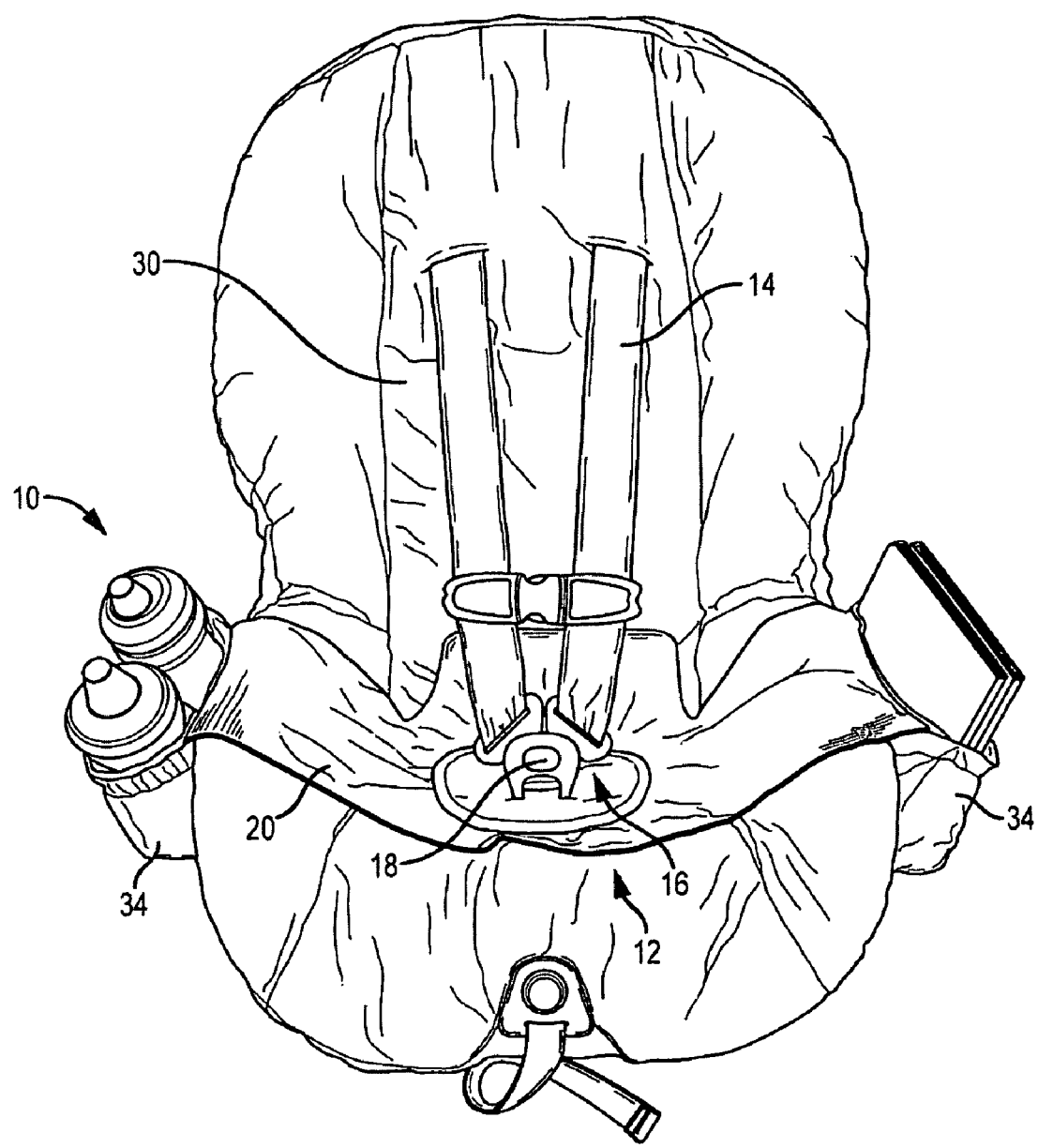
FIG. 2 is a front elevation view of an embodiment of an article holder system and one manner in which the article holder system could be used with a seat device, such as a child's safety seat.

With reference to FIGS. 1 and 2, a system 10 is provided for supporting various articles from a seat structure that includes a seating area 12 and at least one restraining member 14. While it is contemplated that the seat structure may be encountered in a nearly limitless number of different forms, some exemplary structures include child safety seats, strollers, highchairs, wheelchairs, and the like. In such examples a frame is provided that supports and orients a seating area 12 in a manner that supports an occupant. One or mote restraining members 14 may be provided that are designed to secure the occupant within the seating area 12. Examples, which should not be deemed as limiting, include waist straps, shoulder straps and the like. Each such restraining member 14 will be generally secured with the seat structure and provide lengths that may be secured at least partially around an occupant. Free end portions of the restraining member 14 are typically provided with a multi-component fastener 16 that may have its components, such as a three and two-point latching assemblies having male and female-oriented clips, buckles and the like, secured with one another. In a common orientation, a crotch strap 18 is provided as a part of the restraining member 14 and will be coupled with, and extend upwardly from, the seat structure, adjacent or within the seating area 12. In this manner, the crotch strap 18 may be easily passed between the legs, and in front of the crotch area of, an occupant who is seated in the seating area 12. Such crotch straps typically have a free end portion that supports a component of the multi-component fastener, such as a buckle, that enables the crotch strap 18 to securably engage other portions of the multi-component fastener 16 located at the free end portions of other straps, such as waist and shoulder straps.

Figure 3:
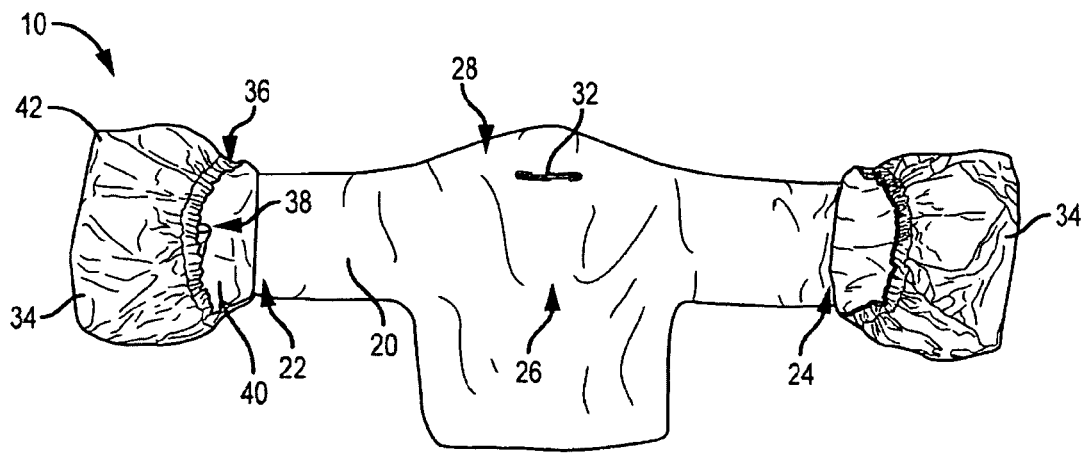
FIG. 3 is a top, plan view of one embodiment of the article holder system having a pair of pocket members coupled with a support member.

With reference to FIG. 3, the system 10 may be provided with a generally flexible support member 20, having a first end portion 22, a second end portion 24, a rearward end portion 26 and a forward end portion 28. The support member 20 may be provided in a variety of different shapes and sizes to accommodate the intended use of the system 10. However, in various embodiments, the support member will have a generally elongated shape extending between the first end portion 22 and the second end portion 24. The length of the support member 20 will, in many embodiments extend substantially along a width of the seating area 12 and, in other embodiments extend beyond side portions of the seating area 12 so that the first end portion 22 and second end portion 24 may depend from the side portions of the seating area 12. In one aspect, the rearward end portion 26 of the support member may be provided to terminate short of a rearward edge portion of the seating area 12. In some embodiments, however, the rearward end portion 26 may be provided to extend beyond the rearward edge portion of the seating area 12 so that a portion of the rearward end portion 26 may depend from the rearward end portion of the seating area 12 or extend at least partially up a surface of a back support 30 of the seat structure. In this orientation, the support member may at least partially serve as a crumb catching device that helps to keep the seating area 12 clean. In some embodiments, the forward end portion 28 of the support member 12 may be provided to extend short of a forward edge portion of the seating area 12. However, in other embodiments, the forward end portion 28 of the support member may be provided to extend close to, or beyond, the forward edge portion of the seating area 12. In this manner a greater coverage of the seating area 12 may be attained, possibly contributing to the comfort of the occupant and protection of the seat area 12 from spills and the like.

In some embodiments, the support member 20 is formed to have an aperture 32 formed through the support member 20, between the fist end portion 22, second end portion 24, rearward end portion 26 and forward end portion 28. In one aspect, the aperture 32 is shaped and sized to permit at least a potion of the restraining member 14 to be passed through the aperture 32 when the support member 20 is placed along the seating area 12 of the seat structure. In one aspect, the aperture 32 is shaped, and positioned along the support member 12, to accept the free end portion of the crotch strap 18 there through. Accordingly, it is contemplated that the aperture 32 should be large enough to permit the free end portion of the crotch strap 18 to pass there through. However, it is further contemplated that the aperture 32 could be sized and shaped to approximate the width and thickness of the crotch strap 18. In this manner a relatively snug engagement between the aperture 32 and the free end portion of the crotch strap 18 may be attained and movement of the support member 20 across the seating area 12 may be limited. In other embodiments, portions of other straps, such as waist or shoulder straps may be passed through the aperture 32 in a manner similar to that described with respect to the crotch strap 18. In such instances it is contemplated that the size, location, and number of apertures 32 may vary to accommodate the circumstances presented, including the shape and nature of the seat structure as well as the manner in which an individual will occupy the seating area 12. In another aspect, the support member 20 may also be secured to the seating area 12 using one or more mechanical fasteners, such as hook and loop material, snaps, buttons, and the like.

Figure 4:
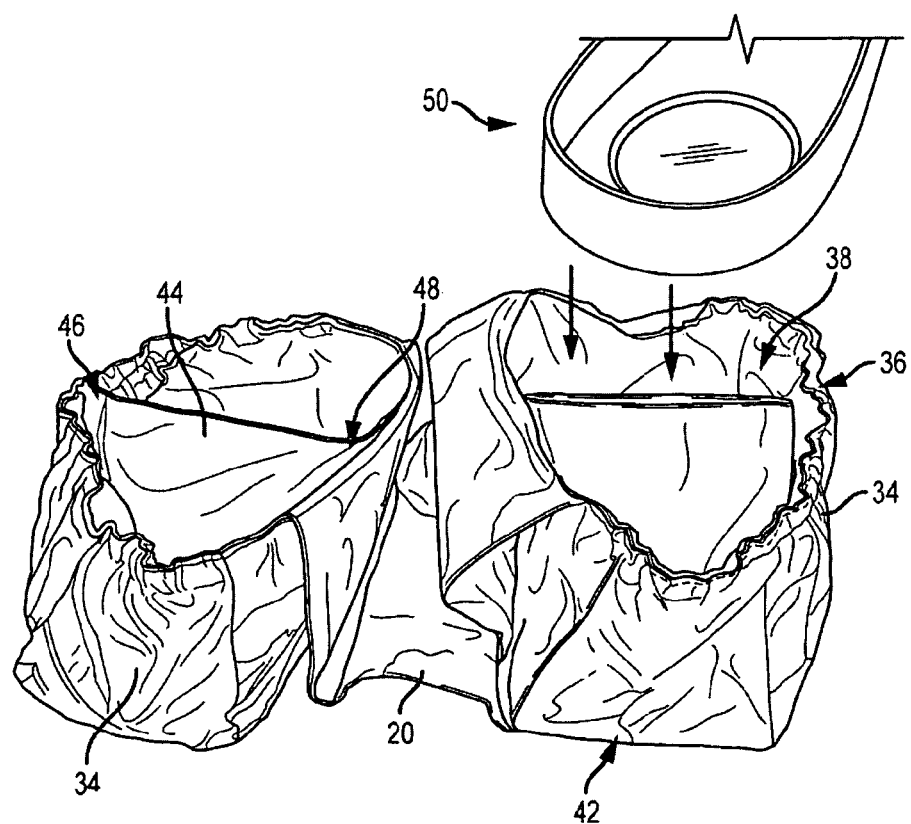
FIG. 4 is a perspective view of another embodiment of the article holder system that incorporates the use of dividers within the pocket members for subdividing the interior compartments of the pocket members.

With reference to FIG. 4, the system 10 may be provided with one or more pocket members 34. The pocket members 34 may be provided in a wide array of shapes and sizes to accommodate the needs of nearly any situation presented. However, the pocket members 34 will generally be provided with an open upper end portion 36 that is in communication with at least one open interior compartment 38. One or more sidewalls 40 will extend between the open upper end portion 36 and a bottom end portion 42 of the pocket members 34. It is contemplated that the open upper end portion 36 and the one or more interior compartments 38 may be shaped and sized to accommodate a wide array of articles. It is further contemplated that the size and shape of the open upper end portion 36 and the one or more interior compartments 38 may be provided to accommodate specific articles, such as books, drink containers, and the like. While the open upper end portion 36 of the pocket members 34 may be provided in an open and exposed fashion, thus promoting the ease with which articles may be inserted and removed from the pocket members 34, one or more enclosure members may be provided. In some embodiments, enclosure flaps may be provided to cover the open upper end portions 36. In these embodiments, mechanical fasteners, such as buttons, snaps, zippers, magnets, hook-and-loop materials, and the like may be employed to secure a free end portion of such enclosure flaps with a sidewall 40 of the pocket members 34. Similarly, the open upper end portion 36 of the pocket members 34 may be collapsed and closed on itself and, optionally, secured using a mechanical fastener, such as those previous described.

With reference to FIG. 4 at least one divider 44, having a first end portion 46 and second end portion 48, may be coupled at its end portions with interior surface of a pocket member 34. In one embodiment, the first end portion 46 and second end portion 48 may be secured to opposite or adjacent inner surfaces of an interior compartment 38 to define a plurality of open interior compartments 38 within a pocket member 34. A height of the divider 44 may be varied to create a division that is shallow or deep with respect to the interior compartment 38. In some embodiments, either or both of the first end portion 46 or the second end portion 48 may be removably engagable with an interior surface of the pocket member 34. Mechanical fasteners, such as hook-and-loop materials, snaps, buttons and the like may be used for releasably engaging the end portions of the divider 44 with the interior surfaces of the pocket member 34. In some embodiments, multiple dividers 44 may be used within a single pocket member to create a nearly limitless number of different compartment arrangements. The use of one or more dividers 44 may allow multiple items to be secured in a single pocket member 34. For instance, the divider 44 may be used to separate an ice pack from a drink.

In some embodiments, the one or more pocket members 34 may include an insert 50 that assists in the stabilizing the pocket member 34 and defining its shape. The insert 50 may be formed form a variety of materials, such as plastic or metal, to present a desired level of rigidity. As such, the insert 50 may be used to reinforce one or more sidewalls 40 and/or a bottom end portion 42 of a pocket member 34. In one aspect, the insert 50 may be positioned in the bottom of a pocket member 34. In such an embodiment, the insert 50 may be configured to have a recess or other retaining structure that is shaped and sized to receive a drink container. The insert 50 may be covered with the material used to form the pocket or may be left uncovered. As such, it is contemplated that the insert 50 may provide the pocket member 34 with a degree of protection, serving as a barrier from moisture or spills of various detritus. A relatively flat or otherwise shaped insert 50 may also be associated with one or more dividers 44, where support or specific shape definition is desired.

With reference to FIGS. 1 and 2, the system 10 may, in some embodiments, be provided with a support member 20 and one or more pocket members 34. In one aspect, the one or more pocket members may be secured with the first end portion 22 and second end portion 24 so that, when the system 10 is positioned in a seating area 12, such as the seating area in a child's safety seat or a stroller, the support member traverses the seating area 12 and positions the one or more pocket members 34 adjacent the outer side portion of the seating area 12. In this manner, the one or more pocket members 34 depend from the opposite end portions of the support member 12 and the seat structure. This configuration may facilitate the ability of an occupant of the seat structure to efficiently access the one or more pocket, members 34 while seated in the seating area 12. With reference to FIG. 3, an embodiment of the system 10 is depicted as being used with a stroller.

Where a support member 20 is used to secure one or more pocket members 34 adjacent the seating area 12, it is contemplated that the pocket members 34 may be secured to nearly any peripheral edge portion of the support member 20. While the Figures depict a common position, where the pocket members 34 are secured to the opposite first and second end portions 22 and 24, instances are contemplated where the pocket members may be secured with the rearward edge portion 26 or forward edge portion 28, depending on the orientation of the seating area 12 and the seat structure itself. Other factors contributing to the position of the pocket members with respect to the support member 20 may also include the total number of desired pocket members 34. In one aspect, the pocket members may be permanently secured to, or integrally formed with, the support member 20 by sewing, gluing, or other conventional methods. However, in some embodiments, it may be desirable to temporarily secure the pocket members 34 with the support member 20, such as with mechanical fasteners that include hook and loop material, snaps, buttons, zippers, and the like. Regardless of the manner of attachment selected, the pocket members may be secured to the support member 20 at nearly any point between the open upper end portion 36 and the bottom end portion 42, depending on the desired final position of the pocket members 34 with respect to the seating area 12 and its occupant.

In some embodiments, it may be desirable to secure the one or more pocket members 34 with the seat structure without a support member 20. In such instances, mechanical fasteners, such as hook and loop material, snaps, buttons, straps, and other like fasteners may be used to provide temporary but secure engagement between the structures. Such fasteners may also be used in addition to the support member 20. For instance, one or more fastening mechanisms may be used in addition to the support member 20 in which such mechanisms facilitate the positioning and securing of the one or more pocket members 34 along the outer edge of the seating area 12. This feature may also allow a user to position the one or more pocket members 34 as desired as well as allow the type of pocket to be changed, depending upon the user's needs. The system 10 may further include a plurality of pocket members 34, each of which being shaped and sized to receive a particular type of article.

Figure 5:
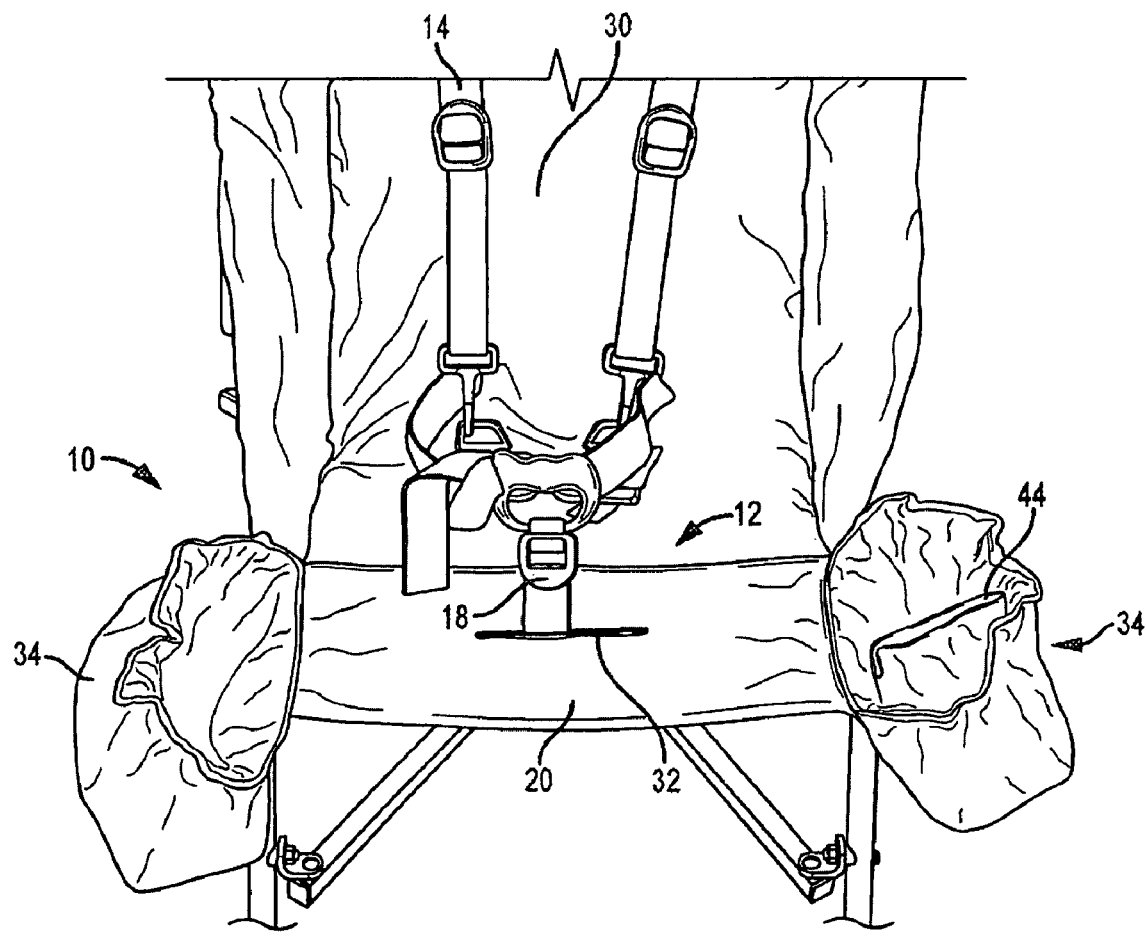
FIG. 5 is a perspective view of another embodiment of the article holder system and one manner in which the article holder system could be used with a seat device, such as a stroller, and secured in position with a restraining member from the stroller.
Figure 6:
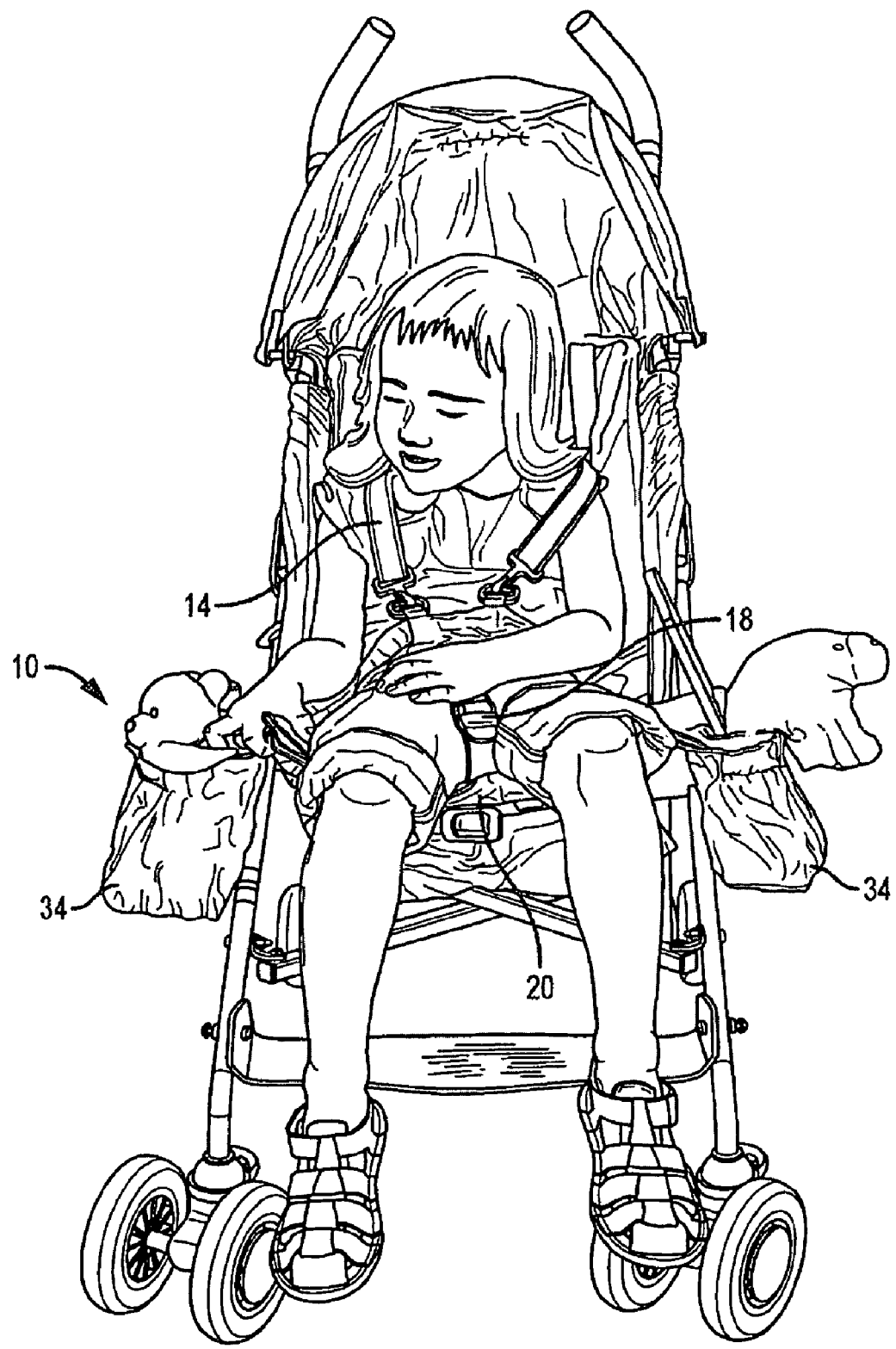
FIG. 6 depicts a front elevation view of one manner in which an article holder system may be coupled with a seat device while an individual simultaneously occupies the seat device.

With reference to FIGS. 5 and 6, at least one method of use calls for a user to place the support member 20 in a desired seating area 12, such as that found in a child's safety seat, stroller and the like. Where an aperture 32 is formed through the support member 20, the support member 20 may be aligned with a restraining member 14, such as a crotch strap 18, proximate the seating area 12 so that at least a portion of restraining member 14 may be passed through the aperture 32. The user may place the occupant into the seating area 12, on top of the support member 20. The restraining member 14 may then be secured about the occupant and the system 10. The user may align one or more pocket members 34 with the support member 20 before or after the occupant enters the seating area 12. If the one or more pocket members 34 are provided with additional fastening mechanisms, then such mechanisms may be fastened to provide additional support to the pocket members 34. Articles may be placed into the one or more pocket members 34 either before the occupant occupies the seating area 12 or after. Dividers 44 and/or inserts 50 may be placed into one or more pocket members 34 as desired. The system 10 may be removed from the seating area once the occupant has exited such area. Where a support member 20 is not used, the aforementioned steps may be employed, but for securing the support member 20 within the seating area 12. Rather the one or more pocket members 34 may be secured adjacent the seating area 12 using the desired mechanical fasteners. In this manner, the pocket members may be coupled with the seat structure before or after the occupant enters the seating area 12. The system 10 may be folded and stored in a compact space for use at a later time.

The support member 20 and/or pocket members 34 may be constructed from flexible material, including washable fabric, water-repellant fabric and other like materials that may allow the system to be efficiently cleaned. This feature may allow the system 10 to be easily cleaned and maintained. The use of a flexible material may also be less likely to cause injury to a user in the event of a car accident, for example, when compared to prior storage devices constructed of more rigid materials, including plastic. The use of flexible materials may also allow the system 10 to be easily stored and carried, such as in a stroller, diaper bag or day-pack when it is not in use.

In one aspect, the support member 20 may be covered with a material that is gentle to a child's skin while the pocket members 34 may be formed of a durable, water-repellant fabric. The use of a non-irritating material may be desirable for it may allow the system to be used by multiple users, including children with sensitive skin. The use of water-absorbent materials along the top surface of the support member 20 may also provide the benefit of wicking away moisture from various spills and accidents, away from the occupant. Furthermore, it is contemplated that various known padded materials may be incorporated within the design of the support member 20 to provide additional comfort to the occupant.

In some embodiments, the method of manufacturing the system 10 may include constructing a support member 20 by first cutting a base material to a size that will allow the desired seating area 12 to be covered. For example, the base material may be cut to approximately 23 inches in length and approximately 6 to 18 inches in width. At least one of the width or length of the base material may be determined by a particular size of the seating area 12 presented (e.g., at least one of the width and length of the base material may be determined by the amount of the seating area 12 one desires to cover). The base material may, in at least one embodiment, be approximately 10 inches in length and approximately 6 inches in width, weighing approximately 0.5 ounces to 1.0 ounces. The base material may also be approximately 12 inches in width, weighing approximately 1.0 ounces to 1.5 ounces.

In some embodiments, the support member 20 may also be formed by folding the material inside out and fastening the edges of the material lengthwise. The material may be folded in half, inside out, and the edges of the material sewn together lengthwise. The material may also be inverted a second time so that the finished side may be presented to the user.

It is contemplated that the support member 20 may be formed, at least in part, using a flexible material, such as a non-woven fabric (e.g., PELLON®) or plastic, to provide stability or rigidity to the support member 20. The dimensions of the flexible material may vary. For instance, the flexible material may be approximately half the width of the base material and be approximately 12 inches in length. The flexible material may be inserted into a base material to provide the support member 20 with additional rigidity while still providing a comfortable surface on which the occupant may sit. For instance, the flexible material may be inserted in the base material so that an equivalent amount of material may be present on either end of the base material. A flexible material may be used that includes an adhesive, such as a heat-activated adhesive that may allow the flexible material to adhere to the base material. This may allow additional rigidity to the support member 20. An iron or other heating device may be used to activate the heat sensitive adhesive. For instance, the heat sensitive adhesive may be activated after the flexible material is inserted into the base material, such as by use of an iron.

As described previously, various embodiments of the system 10 may provide the support member 20 with an aperture 32 to receive at least a portion of a restraining member 14, such as a crotch strap 18 or other type of harness used to secure an occupant within the seating area 12. In one aspect, the aperture 32 may be created by folding the support member 20, such as in half and making a cut, of a desired size, in the body of the support member 20. In some embodiments, the cut may be approximately 4 inches in length and approximately 3 inches from the forward edge portion 28 and sewn, such as button hole might be sewn, so that a portion of the restraining member 14 may repeatedly travel through the aperture 32.

In various embodiments, the one or more pocket members 34 may be created by cutting a desired material, such as various fabrics, to the desired size and shape. In one aspect, two pocket members 34 may be formed by cutting 8 front and back pieces of fabric, 6 inches wide by 4½ inches tall, 8 side pieces, 3 inches wide by 4½ inches tall, 4 bottom pieces, 6 inches wide by 3 inches tall, and 4 insert pockets, 3¾ inches by 3¾ inches. The material may be cut to provide a seam allowance of approximately ⅝ inches. In some embodiments, each assembled pocket member 34 may weigh approximately 3.5 ounces to 4.0 ounces. As such, one embodiment of the system 10 that includes a support member 20 and one pocket member 34 may weight approximately 4.0 ounces to 5.0 ounces. Another embodiment of the system 10 that includes two pocket members 34 and a support member 20 may weigh 7.5 ounces to 9.0 ounces. Inserts 50 may also be formed to fit within the one or more pocket members 34. The inserts 50 may be formed by cutting plastic or a plastic-coated metal, such as by cutting plastic or plastic-coated metal to be approximately 3 inches wide and 3½ inches tall. It is further contemplated that the inserts 50 may be formed to the desired shape and size my one of Various molding techniques.

A pocket member 34 may be assembled by fastening the component pieces with one another. It is contemplated that the order in which the pieces are secured may be varied. For example, a back piece may be sewn to two side pieces, a front piece may then be sewn to the two side pieces, and a bottom piece may be sewn to the four pieces. A pocket member 34 may be inverted and attached to another pocket member 34 that has not been inverted. The two pocket structures may be fastened, such as by stitching, so that one long side remains unsecured (e.g. opened). The pieces of material may then be inverted while pushing one piece of material into the other, thereby forming a lined pocket member 34. The edge of the pocket member 34 may be finished by sewing the edge. The edge may be finished while leaving one side of the edge open to attach the pocket member 34 onto the base material. An additional line of stitching may be made on the pocket member 34, for example, below the first line of stitching while still leaving the one side open. A flexible material such as elastic may be inserted through the opening between the two sewn lines. This flexible material may be pulled slightly to gather the fabric on the side. Such material may be secured in the pocket, such as by fastening the corner where the flexible material was inserted. The flexible material may also be inserted into the front and other side pieces of the pocket member 34.

It is also contemplated that a variety of materials can be used to construct the system 10 such as canvas, back pack ducking, flannel, heavy cotton, denim, polyester and other like fabrics. For example, any flexible material with sufficient rigidity to withstand multiple uses and/or material that is non-invasive to the skin may be used. It is also contemplated that the pocket members 34 could also be made from a material similar to that used to construct the support member 20, or an alternative material such as mesh or similar material. A thinner material such as cotton or thin canvas may be used on the outside of the pocket members 34 while using a more rigid material inside to keep the shape of the pocket members 34. For example, flannel material may be used for the support member 20 and canvas for the pocket members 34.

In some embodiments, additional materials may be employed to provide further stability to the components of the system 10. For instance, hook and loop fastening material or puffy shirt paint may be added to the bottom and/or side of the support member 20 to help keep it in place. Such material may also be added to the pocket members 34, if desired. Fastening means such as hooks or latches may he attached to hold the system 10 in place to the seat structure.

It is contemplated that variations may be made to the article holder system so that it may fit any seat. For example, additional fastening mechanisms such as snaps, hook and loop fastening material, hooks and eyes or buckles may be fastened to the side of the support member 20 and have the pocket members 34 individually attached to the desired location. As such it is contemplated that the disclosed article holder system may be used with not only a child's safety seat or stroller, but other similar seating areas such as those provided in wheel chairs, shopping carts, push cars, wagons, sit and stands, high chairs and booster seats.

Although the system 10 has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for supporting articles from a child car seat or stroller structure that includes a seating area and at least one restraining member; the system comprising:
    a generally flexible support member having a peripheral edge portion including first and second end portions;
    said support member having an aperture penetrating said support member between said first and second end portions; wherein the aperture is formed through the support member proximate to the seating area; and wherein said support member is shaped to have a flap that extends outwardly from a rearward portion of said support member, between said first and second end portions;
    at least a first pocket member (i) having an open upper end portion in communication with at least one open interior compartment; (ii) being operatively coupled with the peripheral edge portion of said support member; and (iii) being comprised of a moisture resistant material; and
    a rigid insert positioned within the open interior compartment of the first pocket member at a bottom end portion of said pocket member, the insert having an upwardly faced recess or an opening that is configured to receive and retain a drink container within the first pocket member;
    thereby forming a system for supporting articles from a child car seat or stroller structure.

2. The system of claim 1 wherein said aperture is shaped to permit at least a portion of the restraining member to be passed through the aperture when said support member is placed along an upper surface of the seating area.

3. The system of claim 1 further comprising a second pocket member (i) having an open upper end portion in communication with at least one open interior compartment and (ii) being operatively coupled with the second end portion of said support member.

4. The system of claim 1 further comprising a pocket divider (i) having first and second end portions operatively coupled with at least one interior surface of said first pocket member and (ii) dividing said open interior pocket within said first pocket member into a plurality of open interior compartments.

5. The system of claim 4 wherein the second end portion of said pocket divider is selectively, removably coupled with an interior surface of said first pocket member.

6. The system of claim 1 wherein the insert at least partially defines a shape of said first pocket member.

7. The system of claim 1 wherein said insert is removable from the interior compartment of said first pocket member.

8. The system of claim 1 wherein said insert is comprised of a moisture resistant material and is configured to protect the interior compartment of the first pocket member from moisture from a drink container retained therein.

9. The system of claim 1 wherein said first pocket member is selectively, removably coupled with said support member.

10. The system of claim 1 wherein said support member is comprised of a moisture absorbent material.

11. In combination:
    a child seat or stroller device including a seat surface and at least one restraining member extending outwardly from the seat device, adjacent the seat surface; and
    an article support system, comprising:
    a generally flexible support member having a peripheral edge portion including first and second end portions;
    said support member having an aperture penetrating said support member between its first and second end portions; wherein the aperture is formed through the support member proximate to the seating area; and wherein said support member is shaped to have a flap that extends outwardly from a rearward portion of said support member, between said first and second end portions;
    at least a first pocket member (i) having an open upper end portion in communication with at least one open interior compartment; (ii) being operatively coupled with the first end portion of said support member; and (iii) being comprised of a moisture resistant material; and
    a rigid insert positioned within the open interior compartment of the first pocket member at a bottom end portion of said pocket member, the insert having an upwardly faced recess or an opening that is configured to receive and retain a drink container within the first pocket member;

said support member being adjacent, and extending transversely across, said seat surface whereby said first pocket member depends from a side portion of said seat device;

at least a portion of said at least one restraining member extending through the aperture in said support member, thereby forming a system for supporting articles from a child car seat or stroller structure while providing a seat for a child.

12. The combination of claim 11 further comprising a second pocket member (i) having an open upper end portion in communication with at least one open interior compartment and (ii) being operatively coupled with the second end portion of said support member.

13. The combination of claim 12 wherein said first pocket member and said second pocket member are removably secured with said support member.

14. The combination of claim 11 further comprising a pocket divider (i) having first and second end portions operatively coupled with at least one interior surface of said first pocket member and (ii) dividing said open interior pocket within said first pocket member into a plurality of open interior compartments.

15. The combination of claim 14 wherein the second end portion of said pocket divider is selectively, removably coupled with an interior surface of said first pocket member.

16. The combination of claim 11 wherein said support member being positioned so that said flap extends at least partially up a surface of a back support of the seat device.

17. In combination:
a child car seat device or stroller that includes a frame that supports a seat surface; and an article support system, comprising:
a generally flexible support member having a peripheral edge portion including first and second end portions, wherein the generally flexible support member is shaped to have a flap that extends outwardly from a rearward portion of said support member, between said first and second end portions;
said support member having at least one mechanical fastener releasably securing said support member with said seat device;
at least a first pocket member (i) having an open upper end portion in communication with at least one open interior compartment; (ii) being operatively coupled with the peripheral edge portion of said support member; and (iii) being comprised of a moisture resistant material; and
a rigid insert positioned within the open interior compartment of the first pocket member at a bottom end portion of said pocket member, the insert having an upwardly faced recess or an opening that is configured to receive and retain a drink container within the first pocket member;
said support member being adjacent, and extending substantially transversely across said seat surface whereby said first pocket member depends from said seat device, thereby forming a system for supporting articles from a child car seat device or stroller while providing a seat for a child.

18. The combination of claim 17 further comprising a second pocket member (i) having an open upper end portion in communication with at least one open interior compartment and (ii) being removably coupled with the peripheral edge portion of said support member.

19. The combination of claim 17 wherein said support member is comprised of a moisture absorbent material.

20. A method for supporting articles, the method comprising:
providing a structure including a seating area and at least one restraining member;
providing an article support system comprising:
a generally flexible support member having a peripheral edge portion including first and second end portions;
said support member having an aperture penetrating said support member between said first and second end portions, wherein the aperture is formed through the support member proximate to the seating area; and wherein said support member is shaped to have a flap that extends outwardly from a rearward portion of said support member, between said first and second end portions;
at least a first pocket member (i) having an open upper end portion in communication with at least one open interior compartment and (ii) being operatively coupled with the peripheral edge portion of said support member; and
a rigid insert positioned within the open interior compartment of the first pocket member at a bottom end portion of said pocket member, the insert having an upwardly faced recess or an opening that is configured to receive and retain a drink container within the first pocket member;
positioning said support member along an upper surface of the seating area whereby said first pocket member is supported along said structure, at least partially outside the seating area of said structure; and
positioning said at least one restraining member at least partially through the aperture in said support member.

21. The method of claim 20 further comprising:
positioning a person in a seated position on top of said support member and the seating area of said structure; and placing one or more articles within the open interior compartment of said first pocket member.

22. The method of claim 20 further comprising operatively coupling a second pocket member (i) having an open upper end portion in communication with at least one open interior compartment and (ii) being operatively coupled with the second end portion of said support member.

23. The method of claim 20 further comprising operatively coupling a pocket divider, having first and second end portions, with interior surfaces of said first pocket member whereby a plurality of open interior compartments are defined within said first pocket member.

24. The method of claim 23 further comprising removably coupling the second end portion of said pocket divider with an interior surface of said first pocket member.

25. The method of claim 20 wherein the insert defines a shape of said first pocket-member.

26. The method of claim 20 wherein said insert is removable from the interior compartment of said first pocket member.

27. The method of claim 20 wherein said insert is at least partially formed from a moisture resistant material and is configured to protect the interior compartment of the first pocket member from moisture from a drink container retained therein.

28. The method of claim 20 wherein said first pocket member is removably coupled with said support member.

29. The method of claim 20 wherein said support member is at least partially formed from of a moisture absorbent material.

30. The method of claim 20 wherein said first pocket member is at least partially formed from a moisture resistant material.

31. The method of claim 20 further comprising:
a flap that extends outwardly from the peripheral edge portion of said support member, between said first and second end portions; and
positioning said support member so that said flap extends outwardly from a rearward end portion of said seating area.

32. The method of claim 31 further comprising positioning said flap so that it extends at least partially up a surface of a back support of the structure.

* * * * *